United States Patent [19]
Bowser et al.

[11] Patent Number: 5,914,983
[45] Date of Patent: Jun. 22, 1999

[54] DIGITAL SIGNAL ERROR REDUCTION APPARATUS

[75] Inventors: Todd Stephen Bowser, Itami; Daisuke Hayashi, Osaka; Ippei Kanno, Katano; Seiji Sakashita, Hirakata; Hiroaki Ozeki, Osaka, all of Japan

[73] Assignee: Matsushita Electric Industrial Co., Ltd., Osaka, Japan

[21] Appl. No.: 08/523,913

[22] Filed: Sep. 6, 1995

[30] Foreign Application Priority Data

Sep. 6, 1994 [JP] Japan ..................... 6-239461

[51] Int. Cl.⁶ .................. H03H 7/30; H03H 7/40; H03K 5/159
[52] U.S. Cl. .............. 375/232; 375/350; 364/724.2; 371/37.7
[58] Field of Search .................... 375/232, 285, 375/296, 346, 350; 371/48, 37.7, 41.1; 370/291; 364/724.16, 737, 724.2; 348/845.1

[56] References Cited

U.S. PATENT DOCUMENTS

| | | | |
|---|---|---|---|
| 5,065,241 | 11/1991 | Iga . | |
| 5,243,624 | 9/1993 | Paik et al. ................... | 375/14 |
| 5,299,004 | 3/1994 | Joo et al. ................... | 348/614 |
| 5,311,546 | 5/1994 | Paik et al. ................... | 375/14 |
| 5,475,444 | 12/1995 | Kim ........................... | 348/608 |
| 5,481,564 | 1/1996 | Kakuishi et al. .............. | 375/230 |
| 5,495,203 | 2/1996 | Harp et al. ................... | 329/306 |
| 5,517,527 | 5/1996 | Yu ............................ | 375/233 |
| 5,535,150 | 7/1996 | Chiang ....................... | 364/724.19 |
| 5,537,443 | 7/1996 | Yoshino et al. ............... | 375/340 |
| 5,710,792 | 1/1998 | Fukawa et al. ................ | 375/229 |

OTHER PUBLICATIONS

Giorgio Picchi and Giancarlo Prati, *Blind Equalization and Carrier Recovery Using a "Stop–and–Go" Decision–Directed Algorithm*, Sep., 1987, 11 Pages.

*Primary Examiner*—Jason Chan
*Assistant Examiner*—Jean B Corrielus
*Attorney, Agent, or Firm*—Wenderoth, Lind & Ponack, L.L.P.

[57] ABSTRACT

A digital signal error reduction apparatus of the present invention tracks and reduces both quickly changing errors and static errors in a digital signal which are caused by time variant multipath distortion, co-channel interference, and other transmission path interferences, including nonlinear distortion. A transversal filter is implemented for filtering the digital signal. A error detection device is implemented for calculating an error of the digital signal. A coefficient engine device is used for receiving the digital signal and the error, for extracting the error, and for updating a tap coefficient for the transversal filter so that the error is minimal.

6 Claims, 3 Drawing Sheets

DIGITAL SIGNAL ERROR REDUCTION APPARATUS

BACKGROUND OF THE INVENTION

1. Field of the Invention

The present invention relates to a digital signal error reduction apparatus which is capable of reducing static quickly and changing interferences quickly through the transmission of digital signals, thereby increasing the accuracy of symbol detection.

2. Description of Prior Arts

The major impairments of any transmission scheme are nonlinear distortions, multipath distortions, co-channel interference, and time changing variants thereof.

In analog systems, these impairments are typically compensated through the use of a "Ghost Canceling Tuner" or an adaptive equalizer. For this purpose, the Broadcasting Technology Association (BTA) in Japan developed a training reference signal which is to be inserted into an NTSC (National Television System Committee) television transmission for use by an equalizer. In the equalizer, the received training signal is compared with a stored reference signal. Any difference of data between the received training signal and the stored reference signal may be used to compute a solution for filter tap-coefficient values which are used to compensate for errors. This is a practical application for the NTSC television transmission system due to previously unused, and thus available, time intervals in a data format into which the stored reference signal could be easily, though costly, inserted.

In digital systems, these impairments are typically compensated through the use of a decision feedback adaptive equalizer. Unlike the analog NTSC transmission scheme, digital transmission schemes generally do not contain empty or available time intervals into which a training reference signal may be inserted. A data stream is comprised of a fixed number of coded digital symbol data in a continuous and, for example in 32 QAM, a spectrum-balanced and random-like sequence. However, since the symbol data of a digital system is restricted to a small number of discrete values, a decision device may be used to determine the best choice value for each symbol. A training signal may be computed by passing a recovered digital signal through such a decision device. If the error is sufficiently small, the decision device will almost always select the correct value for each symbol in the signal. A subtraction of an input of the decision device from the computed training signal results in the error signal. This error signal can be used to compute tap-coefficients for a filter and to compensate for errors in the same manner as the analog system. This system has been utilized successfully in controlled environments such as cable based modem systems in which general characteristics of the signal path are known and impairments rarely rise above expected levels. For terrestrial broadcast systems, it imposes strict limitations such that when a distortion level rises to a height at which the decision device can no longer select the correct symbol for a given input, its output can no longer be used as the training reference signal. Therefore, the computed reference signal is incorrect. Thus, the derived error data is also erroneous and results in incorrect tap-coefficient computation. Derivation of an error signal which can be used for tap-coefficient computation under this condition, in the absence of a training signal, is referred to as blind equalization.

One example of a blind equalization algorithm was developed by Giorgio Picchi and Giancarlo Prati and is referred to as the "Stop-and-Go" algorithm (see "Blind Equalization and Carrier Recovery Using a "Stop and Go" Decision-Directed Algorithm" by Picchi and Prati, IEEE Transactions on Communications, Vol. COM-35, No. 9, September 1987). Picchi and Prati introduced a binary switching algorithm which inhibits a coefficient update from any unreliable data point in the error signal. Simply put, the algorithm 'stops' when a data point from a standard error signal fails a reliability check, and 'goes' when a data point passes the reliability check. The "Stop-and-Go" technique may be applied directly to generate an error signal which replaces the standard error signal in a digital signal equalizer system and is accompanied by algorithms for joint gain control and carrier phase adjustment.

FIG. 6 is a block diagram of a digital signal error reduction apparatus of the prior art. In FIG. 6, reference numeral 1 denotes a transversal filter. Reference numeral 2 denotes an error detector. Reference numeral 100 denotes a microprocessor (CPU) or a digital signal processor (DSP) controller. The transversal filter 1 receives a digital signal and reduces signal error. The error detector 2 receives an output of the transversal filter 1 and outputs an error signal e(t) based on the blind error estimation techniques. The CPU or DSP controller 100 receives an input digital signal z(t) and the error signal e(t) and creates coefficients for the transversal filter 1 using one of a number of traditional algorithms such as the LMS (Least Mean Square), zero forcing, MSE (Mean Square Error), FFT (Fast Fourier Transform), or any other algorithm utilized by NTSC television transmission ghost canceling tuners.

Tap coefficients are typically calculated and updated in non-real time using a microprocessor (CPU) or a digital signal processor (DSP) where signal data is first gathered by the processor and then used internally for calculations. There is a problem in that blind error estimation algorithms are inaccurate and also require many more calculations, to compute acceptable coefficients, than systems using a training reference signal. This requires much more processor time and, as a result, a slow rate of coefficient calculation is experienced. Also, typical non-real time coefficient updates are slow and quickly changing signal interferences cannot be tracked.

SUMMARY OF THE INVENTION

An object of the present invention is to provide an apparatus which can calculate transversal filter coefficients for digital signal error reduction quickly, and in real-time, using a blind algorithm processing to track and reduce both quickly changing errors and static errors in the signal path such as those caused by time variant multipath distortion, co-channel interference, and other transmission path interferences, including non linear distortion.

In order to achieve this object, the present invention provides a digital signal error reduction apparatus comprising a transversal filter means for receiving a digital signal and for filtering the digital signal, an error detection means for calculating an error of the digital signal, and a coefficient engine means for receiving the digital signal and the error, for extracting the error at one of m times (m is a natural number), and for updating a tap coefficient of the transversal filter so that the error is minimal.

DESCRIPTION OF THE PREFERRED EMBODIMENTS

Figure 1:
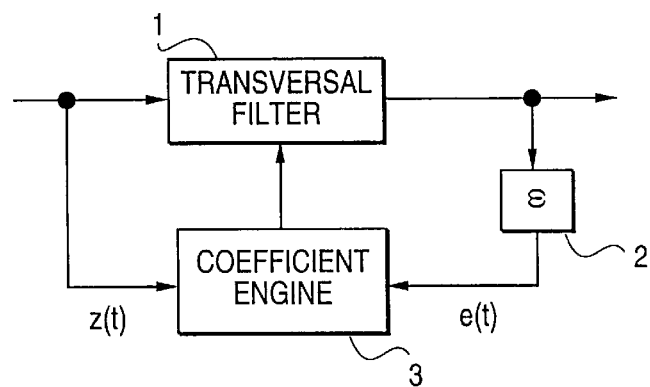
FIG. 1 is a block diagram of a digital signal error reduction apparatus of a first embodiment according to the present invention.

FIG. 1 is a block diagram of a digital signal error reduction apparatus of a first embodiment according to the present invention. This apparatus comprises a transversal filter 1, an error detector 2, and a coefficient engine 3. The transversal filter 1, which is a synchronously or fractionally spaced type possibly including decimation at its output, receives a complex or scalar digital signal and removes signal errors. The error detector 2 receives a complex or scalar output of the transversal filter 1 and outputs a computed error signal. The single coefficient engine 3, or parallel multiples thereof, receives the complex or scalar digital signal and the computed error, extracts the computed error at one of m times (m is a natural number), and calculates scalar or complex coefficients for the transversal filter so that the error is minimal.

Figure 2:
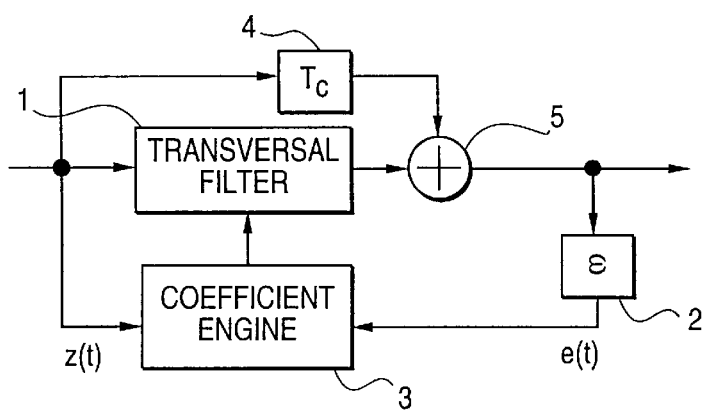
FIG. 2 is a block diagram of a digital signal error reduction apparatus of a second embodiment according to the present invention.

FIG. 2 is a block diagram of a digital signal error reduction apparatus of a second embodiment according to the present invention. In FIG. 2, reference numeral 4 is a scalar or complex delay device and 5 is a scalar or complex adder. FIG. 2 varies from FIG. 1 in that the transversal filter 1 outputs an error correction signal rather than the complex or scalar output. The error correction signal of the transversal filter 1 is added to, or subtracted from, the digital signal output of the scalar or complex delay device 4 by the scalar or complex adder 5. A first adder means output of the scalar or complex adder 5 is an output of the digital signal error reduction apparatus. The value of the delay device 4 is used to locate a center tap of the transversal filter 1. This allows all coefficients of the transversal filter 1 to be initialized to zero, increases the overall accuracy of the filter, and reduces a chance of overflow, particularly in cases where positive gain is a component of tap coefficients of the transversal filter 1.

Figure 3:
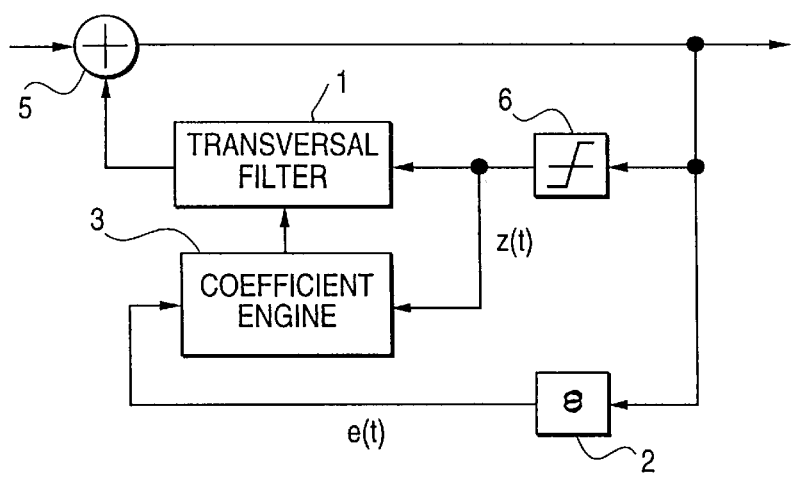
FIG. 3 is a block diagram of a digital signal error reduction apparatus of a third embodiment according to the present invention.

FIG. 3 is a block diagram of a digital signal error reduction apparatus in connection with one embodiment according to the present invention. In FIG. 3, reference numeral 6 is a scalar or complex slicer (symbol detector). FIG. 3 varies from FIG. 1 and FIG. 2 in that the transversal filter 1 outputs a feedback error correction signal rather than the complex or scalar output or the error correction signal. The feedback error correction signal or transversal filter means output of the transversal filter 1 is added to, or subtracted from, the complex or scalar digital signal by the scalar or complex adder 5. The first adder means output of the scalar or complex adder 5 is the output of the digital signal error reduction apparatus. The output of the digital signal error reduction apparatus is fed back into the scalar or complex slicer 6. The slicer means output of the scalar or complex slicer 6 is in turn fed to the transversal filter 1 and the coefficient engine 3. The slicer 6 outputs a symbol level of an output of the adder 5. The feedback error correction signal is used to reduce recursive errors and may be used in the digital signal error reduction apparatus such as those of the first and second embodiments.

Figure 4:
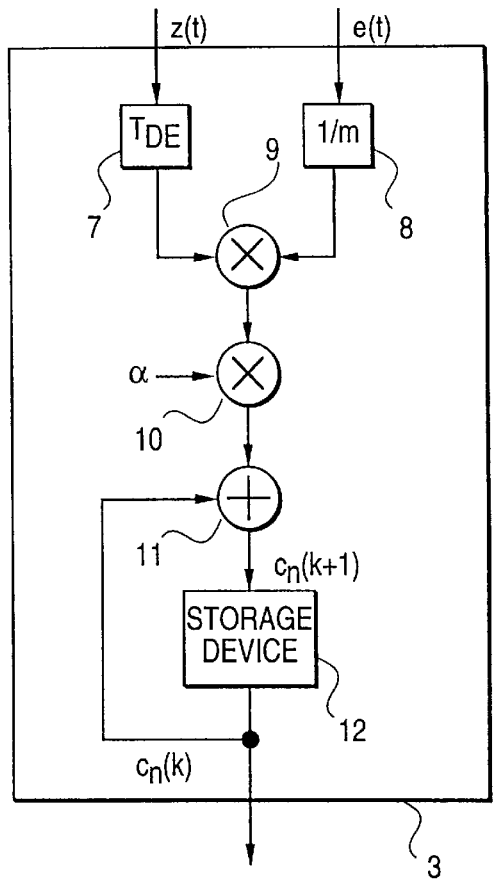
FIG. 4 is a block diagram of a first example of a coefficient engine.

The coefficient engine is explained hereinafter. FIG. 4 shows a first example of the coefficient engine 3 which generates the scalar or complex coefficients for the transversal filter 1. Reference numeral 7 depicts a delay device (TDE), 8 depicts a subsampler (1/m), 9 depicts a multiplier, 10 depicts an additional multiplier, 11 depicts an adder, and 12 depicts a storage device.

The complex or scalar digital signal z(t) is received by the delay device 7. The delay device 7 delays the complex or scalar digital signal z(t) by a delay time TDE to obtain a complex or scalar delay means output z*(t0+mkT−nT), where z* is a complex conjugate of z(t), t0 is a starting point in time, m is a total number of the tap coefficients in the transversal filter 1, k is a calculation time, T is a data sampling interval of the digital signal error reduction apparatus, n is a coefficient address which is equal to, or greater than, zero and is less than m. The computed error e(t) is received by the subsampler 8. The subsampler 8 performs 1/m subsampling of the computed error e(t) to obtain a scalar or complex subsampling means output e(t0+mk). The multiplier 9 multiplies the scalar or complex delay means output of the delay device 7 and the scalar or complex output of the subsampler 8 to obtain a first multiplying means output. A fixed or time variant step size coefficient a is multiplied, by a scalar or complex output of multiplier 9, in the additional multiplier 10 to obtain a second multiplying means output. In the adder 11, an output of the additional multiplier 10 is added to a current value Cn(k) of an nth scalar or complex coefficient outputted from the storage device 12 to obtain an updated value Cn(k+1) or adder means output of the nth scalar or complex coefficient of the succeeding iteration. The updated value Cn(k+1) is held in the storage device 12. The current value Cn(k) is also an output of the coefficient engine 3. A single coefficient output value Cn(k+1), isolated with respect to the starting point t0 in time, is calculated with respect to each iteration k as:

$$\hat{c}n(k+1) = \hat{c}n(k) - \alpha \hat{e}(t0+mk)z^*(t0+mkT-nT) \quad (1)$$

which differs from an LMS algorithm by indexing and error e(t). Here, ĉn and ê are vectors of cn and e, respectively. A single iteration is a computation of each cn, one per coefficient engine 3 per fractionally or synchronously spaced clock, for all n, as performed by the single coefficient engine 3 or multiples of the coefficient engine 3 in parallel.

Figure 5:
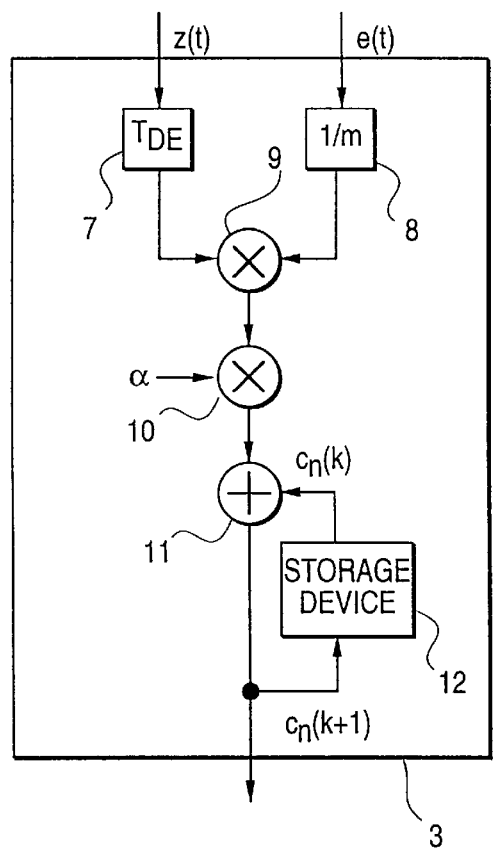
FIG. 5 is a block diagram of a second example of the coefficient engine.
Figure 6:
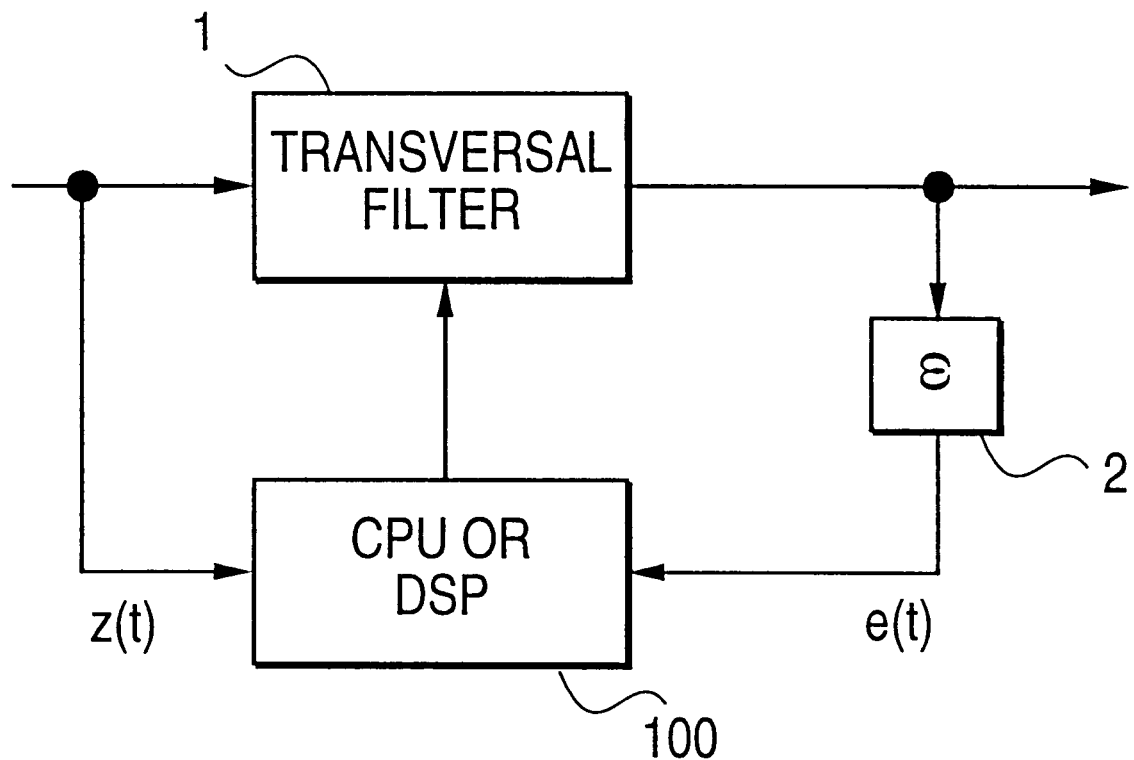
FIG. 6 is a block diagram of a prior art digital signal error reduction apparatus.

FIG. 5 shows a second example of the coefficient engine 3 which generates scalar or complex coefficients for the transversal filter 1.

The complex or scalar digital signal z(t) is received by the delay device 7. The delay device 7 delays the complex or scalar digital signal z(t) by the delaying time TDE to obtain the complex or scalar output z*(t0+mkT−nT), where z* is the complex conjugate of z(t), t0 is the starting point in time, m is the total number of the scalar or complex coefficients in the transversal filter 1, k is the calculation time, T is the data sampling interval of the digital signal error reduction apparatus, n is the coefficient address which is equal to, or greater than, zero and is less than m. The computed error e(t) is received by the subsampler 8. The subsampler 8 performs 1/n subsampling to the computer error e(t) to obtain the scalar or complex subsampling means output e(t0+mk). The multiplier 9 multiplies the scalar or complex delay means output of the delay device 7 and the scalar or complex output of the subsampler 8 to obtain a first multiplying means output. The fixed or time variant step size coefficient α is multiplied, by the scalar or complex output of multiplier 9, in the additional multiplier 10 to obtain a second multiplying means output. In the adder 11, the output of the additional multiplier 10 is added to the current value cn(k) of the nth scalar or complex coefficient outputted from the storage device 12 to obtain the updated value cn(k+1) of the nth scalar or complex coefficient of the succeeding iteration. The updated value cn(k+1) is held in the storage device 12. The updated value cn(k+1) is also an output of the coefficient engine 3. A single coefficient output value cn(k+1), isolated with respect to the starting point t0 in time, may be calculated with respect to each iteration k as:

$$\hat{c}n(k+1)=\hat{c}n(k)-\alpha\hat{e}(t0+mk)z^*(t0+mkT-nT) \quad (2)$$

which differs from the LMS algorithm by indexing and error e(t). Here, ĉn and ê are vectors of cn and e, respectively. A single iteration is a computation of each cn, one per coefficient engine 3 per fractionally or synchronously spaced clock, for all n, in parallel.

As described above, fast error reduction of the complex or scalar digital signal and real time error tracking can be achieved without the use of the microprocessor or the digital signal processor by implementing the symbol rate or faster subsampling coefficient calculation circuit in hardware.

What is claimed is:

1. A digital signal error reduction apparatus, said apparatus comprising:

a transversal filter means for receiving a digital signal and a tap coefficient and for filtering the digital signal using the tap coefficient;

an error detection means for calculating an error of the digital signal filtered by said transversal filter means at predetermined data sampling intervals to obtain a plurality of sampled values of the error in a predetermined period of time; and a coefficient engine means for receiving the digital signal and the error, for subsampling one of the plurality of sampled values of the error to obtain a subsampled value of the error in the predetermined period of time, and for updating the tap coefficient of said transversal filter means by using the subsampled value of the error so that the error is minimal.

2. A digital signal error reduction apparatus according to claim 1, wherein said coefficient engine means comprises:

a delay means for delaying the digital signal and for providing a delay means output;

a subsampling means for subsampling the error and for providing a subsampling means output;

a first multiplying means for multiplying the delay means output with the subsampling means output and for providing a first multiplying means output;

a second multiplying means for multiplying the first multiplying means output with a predetermined coefficient and for providing a second multiplying means output;

an adder means for adding the second multiplying means output with a storage device means output and for providing an adder means output; and a storage device means for storing the adder means output and for providing the storage device means output.

3. A digital signal error reduction apparatus, said apparatus comprising:

a transversal filter means for receiving a digital signal and a tap coefficient and for filtering the digital signal using the tap coefficient;

a delay means for delaying the digital signal;

an adder means for adding the digital signal filtered by said transversal filter means with the digital signal delayed by said delay means and for providing a adder means output;

an error detection means for calculating an error of the adder means output; and a coefficient engine means for receiving the digital signal and the error, for extracting the error at one of m times, wherein m is an integer, and for updating the tap coefficient of said transversal filter means so that the error is minimal.

4. A digital signal error reduction apparatus according to claim 3, wherein said coefficient engine means comprises:

a second delay means for delaying the digital signal and for providing a second delay means output;

a subsampling means for subsampling the error and for providing a subsampling means output;

a first multiplying means for multiplying the second delay means output with the subsampling means output and for providing a first multiplying means output;

a second multiplying means for multiplying the first multiplying means output with a predetermined coefficient and for providing a second multiplying means output;

a second adder means for adding the second multiplying means output with a storage device means output and for providing a second adder means output; and a storage device means for storing the second adder means output and for providing the storage device means output.

5. A digital signal error reduction apparatus, said apparatus comprising:

a an adder means for receiving a digital signal, for adding a transversal filter means output with the digital signal, and for providing a an adder means output;

a slicer means for determining a symbol value of the adder means output and for providing a slicer means output;

a transversal filter means for receiving the slicer means output and a tap coefficient, for filtering the slicer means output using the tap coefficient, and for providing the transversal filter means output;

an error detection means for calculating an error of the adder means output; and a coefficient engine means for receiving the slicer means output and the error, for extracting the error at one of m times, wherein m is an integer, and for updating the tap coefficient of said transversal filter means so that the error is minimal.

6. A digital signal error reduction apparatus according to claim 5, wherein said coefficient engine means comprises:

a delay means for delaying the slicer means output and for providing a delay means output;

a subsampling means for subsampling the error and for providing a subsampling means output;

a first multiplying means for multiplying the delay means output with the subsampling means output and for providing a first multiplying means output;

a second multiplying means for multiplying the first multiplying means output with a predetermined coefficient and for providing a second multiplying means output;

a second adder means for adding the second multiplying means output with a storage device means output and for providing a second adder means output; and a storage device means for storing the second adder means output and for providing the storage device means output.

* * * * *